United States Patent
Dazet

(10) Patent No.: US 10,399,671 B2
(45) Date of Patent: Sep. 3, 2019

(54) REAR DOOR OF A LANDING GEAR BOX COMPRISING AN AIR PASSAGE ORIFICE AND A CLOSURE MEMBER OF THE LATTER

(71) Applicant: Airbus Operations SAS, Toulouse (FR)

(72) Inventor: Francis Dazet, Tournous Darre (FR)

(73) Assignee: Airbus Operations SAS, Toulouse (FR)

( * ) Notice: Subject to any disclaimer, the term of this patent is extended or adjusted under 35 U.S.C. 154(b) by 500 days.

(21) Appl. No.: 15/216,141

(22) Filed: Jul. 21, 2016

(65) Prior Publication Data
US 2017/0021919 A1    Jan. 26, 2017

(30) Foreign Application Priority Data

Jul. 24, 2015    (FR) ..................................... 15 57085

(51) Int. Cl.
*B64C 25/16*    (2006.01)
*B64C 25/10*    (2006.01)

(52) U.S. Cl.
CPC .............. *B64C 25/16* (2013.01); *B64C 25/10* (2013.01)

(58) Field of Classification Search
CPC combination set(s) only.
See application file for complete search history.

(56) References Cited

U.S. PATENT DOCUMENTS

| 5,337,977 A |  | 8/1994 | Fleming et al. |
|---|---|---|---|
| 6,213,428 B1 | * | 4/2001 | Chaumel ................. B64C 1/068 244/102 R |
| 7,784,736 B2 | * | 8/2010 | Guering .................... B64C 1/10 244/102 R |
| 8,262,020 B2 | * | 9/2012 | Guering .................. B64C 25/16 244/100 R |
| 2010/0019089 A1 | * | 1/2010 | Sibley .................... B64C 1/1407 244/129.5 |
| 2011/0174933 A1 |  | 7/2011 | Blades |
| 2013/0099052 A1 | * | 4/2013 | Gleyze .................... B64C 25/16 244/100 R |
| 2015/0166173 A1 | * | 6/2015 | Reynes ................... B64C 25/20 244/129.5 |
| 2016/0129995 A1 | * | 5/2016 | Lv .......................... B64C 25/16 244/102 A |

FOREIGN PATENT DOCUMENTS

WO    2008041023    4/2008

OTHER PUBLICATIONS

French Search Report, dated Apr. 11, 2016, priority document.

* cited by examiner

*Primary Examiner* — Assres H Woldemaryam
(74) *Attorney, Agent, or Firm* — Greer, Burns & Crain, Ltd.

(57) ABSTRACT

A landing gear box of an aircraft comprising a front door with independent opening and a rear door with opening mechanically connected to the landing gear, including an orifice in the rear door provided with a closure member and a drive mechanism allowing movement of this closure member independently of any movement of the rear door.

14 Claims, 5 Drawing Sheets ial application No. 15 57085 filed on Jul. 24, 2015, the entire disclosures of which are incorporated herein by way of reference.

REAR DOOR OF A LANDING GEAR BOX COMPRISING AN AIR PASSAGE ORIFICE AND A CLOSURE MEMBER OF THE LATTER

CROSS-REFERENCES TO RELATED APPLICATION

This application claims the benefit of the French patent application No. 15 57085 filed on Jul. 24, 2015, the entire disclosures of which are incorporated herein by way of reference.

BACKGROUND OF THE INVENTION

The present invention relates to the field of aircraft, and more particularly concerns a rear door for a landing gear box, and a landing gear box equipped with such a rear door, an aircraft equipped with such a landing gear box, and finally a method for deployment and a method for retraction of a landing gear using the rear door.

Certain aircraft landing gear boxes are equipped with one or more doors arranged on a front side of the box, called the front doors, and one or more doors arranged on a rear side of the box, called the rear doors.

Operation of the front doors is generally controlled by a dedicated device, while the rear doors are generally mechanically connected to the landing gear such that the landing gear drives the rear doors during its deployment or retraction.

Thus in a landing gear box of this type, the front doors open first while the rear doors open later under the effect of deployment of the landing gear.

This time difference between the opening of the front and rear doors respectively presents disadvantages.

In fact, at the start of the opening sequence of the landing gear box, the air tends to flood into the landing gear box through the open front doors and be held by the closed rear doors, which hinders the aerodynamic performance of the aircraft. Furthermore, this requires structurally reinforcing the doors and/or the landing gear box so as not to risk damaging the components of the landing gear box. The result is an increase in the production cost of the aircraft and an increase in the aircraft mass.

One solution to this problem could comprise providing air passage orifices within the rear doors. However, such orifices would hinder the aerodynamic performance of the aircraft when the front and rear doors are in the closed position, in particular during cruising.

SUMMARY OF THE INVENTION

An object of the invention is, in particular, the provision of a simple, economic and effective solution to this problem.

To this end, the invention proposes a landing gear box for an aircraft, comprising a frame provided with an opening for passage of a landing gear, and at least one front door and at least one rear door which are mounted movably relative to the frame between respective open positions in which the front door and the rear door allow extension of the landing gear through the opening of the frame, and respective closed positions in which the front door and rear door close the opening in the frame.

Furthermore, the rear door comprises at least one orifice, a closure member mounted in the orifice and movable between a closed configuration in which the closure member seals the orifice, and an open configuration in which the closure member allows a flow of air through the orifice, and drive means for driving the closure member between the closed configuration and the open configuration, from the closed configuration to the open configuration and vice versa, independently of any movement of the rear door.

Because of its ability to move independently of the rear door, the closure member may be used to allow the air to flow through the orifice of the rear door, in particular, to allow the air, which floods in from the front of the landing gear box when the front door is opened, to escape while the rear door is still in the closed position. The closure member may also be used to cover the orifice of the rear door when the front and rear doors are closed, for example during cruising, so as to optimize the aerodynamic performance of an aircraft equipped with such a rear door.

In a preferred embodiment of the invention, the drive means belonging to the rear door form a mechanism which cooperates with the front door so as to cause a movement of the closure member into its open configuration when the front door is moved from its closed position to its open position, and so as to cause a movement of the closure member into its closed configuration when the front door is moved from its open position to its closed position.

The opening and closure of the orifice by the closure member may thus be provoked in a particularly simple and reliable manner.

As a variant, the drive means may be of another type. These drive means may, for example, comprise an electric motor or an electric, hydraulic or pneumatic actuator controlled so as to bring the closure member into the open position when the front door opens, and so as to bring the closure member into the closed position when the front door closes.

Preferably, the drive means comprise a lever mounted pivotingly on the rear door such that the lever can be moved between a first position and a second position, wherein the lever comprises a first lever portion connected to the closure member such that the lever stresses the closure member towards its closed configuration when the lever adopts its first position, and such that the lever stresses the closure member towards its open configuration when the lever adopts its second position, and a second lever portion which cooperates with the front door such that a movement of the front door towards its open position causes a movement of the lever towards its second position, whereas a movement of the front door into its closed position causes a movement of the lever towards its first position.

The drive means also advantageously comprise a return device which stresses the lever towards one of its first and second positions, while the front door stresses the lever towards the other of its first and second positions when the front door moves in a predefined direction.

The term "predefined direction" means the direction going from the closed position to the open position, or the opposite direction.

Preferably, the closure member comprises several flaps mounted pivoting around respective axes fixed relative to the door such that the flaps are contiguous in the closed position of the closure member and such that the flaps are spaced apart in the open configuration of the closure member.

In this case, the drive means advantageously comprise a connecting member connecting the flaps together.

In some embodiments, the first lever portion is connected to the connecting member which connects the flaps together.

The invention also concerns an aircraft comprising a landing gear and a landing gear box of the type described above in which the landing gear is housed.

In general, such landing gear can be moved from a position in which the landing gear is retracted inside the landing gear box, to a position in which the landing gear is deployed outside the landing gear box, and vice versa.

In a particularly advantageous application of the invention, the rear door comprises mechanical connecting means which connect it to the landing gear such that the latter drives the rear door from its closed position to its open position during deployment of the landing gear, and such that the landing gear drives the rear door from its open position to its closed position during retraction of the landing gear.

In preferred embodiments of the invention, the aircraft comprises control means configured to cause a movement of the closure member belonging to the rear door from the closed configuration to the open configuration of the closure member as soon as the front door moves from its closed position to its open position, and to cause a movement of the closure member belonging to the rear door from the open configuration to the closed configuration of the closure member when the front door moves from its open position to its closed position.

In the preferred embodiment of the invention, the control means comprise drive means belonging to the rear door.

As a variant, in particular in the case where the drive means are formed from a motor or an actuator, the control means may comprise an electric, hydraulic or pneumatic device allowing activation and deactivation of the drive means.

The invention also concerns a method for deploying a landing gear of an aircraft of the type described above, including successive steps comprising:

moving the front door from the closed position to the open position of the front door, and moving the closure member belonging to the rear door from the closed configuration to the open configuration of the closure member, then deploying the landing gear such that the landing gear drives the rear door towards its open position.

Finally, the invention concerns a method for retracting a landing gear of an aircraft of the type described above, including successive steps comprising:

retracting the landing gear such that the landing gear drives the rear door towards its closed position, then moving the front door from the open position to the closed position of the front door, and moving the closure member belonging to the rear door from the open configuration to the closed configuration of the closure member.

The closure member thus allows air to flow through the orifice of the rear door, in particular, to allow the air, which floods in from the front of the landing gear box when the front door is opened, to escape while the rear door is still in the closed position. The closure member may also cover the orifice of the rear door when the front and rear doors are closed, for example during cruising, so as to optimize the aerodynamic performance of the aircraft.

BRIEF DESCRIPTION OF THE DRAWINGS

The invention will be better understood and further details, advantages and characteristics thereof will appear from reading the description below which is given as a non-limitative example with reference to the attached drawings in which.

In all of these figures, identical references may designate identical or similar elements.

DETAILED DESCRIPTION OF THE PREFERRED EMBODIMENTS

Figure 1:
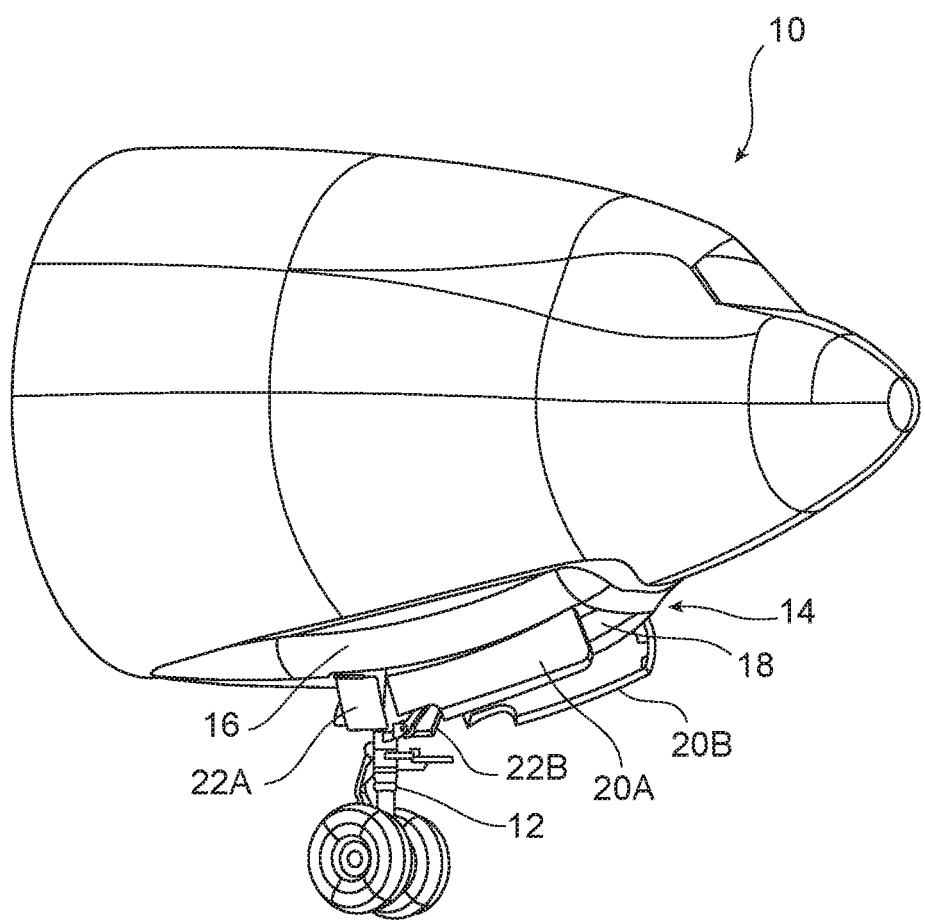
FIG. 1 is a partial, perspective, diagrammatic view of an aircraft according to a preferred embodiment of the invention, illustrating a landing gear box of which the front and rear doors are in the open position.

FIG. 1 illustrates a front part of an aircraft 10 comprising in particular a front landing gear 12, shown deployed. The front landing gear 12 is mounted in a landing gear box 14 so that it can be moved from a retracted position, or inside the landing gear box 14, to its deployed position, or outside, and vice versa.

The landing gear box 14 comprises a frame 16 provided with an opening 18 for passage of the landing gear 12, and doors which can be moved between respective positions for opening and closing the opening 18.

The doors in general comprise one or more doors situated on a front side of the landing gear box, called the front doors in the present description, and one or more doors situated on a rear side of the landing gear box, called the rear doors.

More precisely, the doors comprise two front doors 20A, 20B and two rear doors 22A, 22B. Naturally, the two front doors 20A, 20B are similar and substantially symmetrical to each other. The same applies to the two rear doors 22A, 22B.

The landing gear box 14 comprises a control device (not shown on the figures) dedicated to controlling the front doors 20A, 20B. In a manner known in itself, this control device is activated to control the opening of the front doors 20A, 20B at the start of a sequence of deployment of the landing gear 12, and to control the closure of the front doors 20A, 20B at the end of a sequence of retraction of the landing gear 12.

Still in a manner known in itself, the rear doors 22A, 22B comprise mechanical connecting means which connect them to the landing gear 12 such that the latter drives the rear doors 22A, 22B from their closed position to their open position during its deployment, and such that the landing gear 12 drives the rear doors 22A, 22B from their open position to their closed position during its retraction.

Thus, during a sequence of deployment of the landing gear 12, the front doors 20A, 20B open before the rear doors 22A, 22B, whereas, during a sequence of retraction of the landing gear 12, the rear doors 22A, 22B close before the front doors 20A, 20B.

Figure 2:
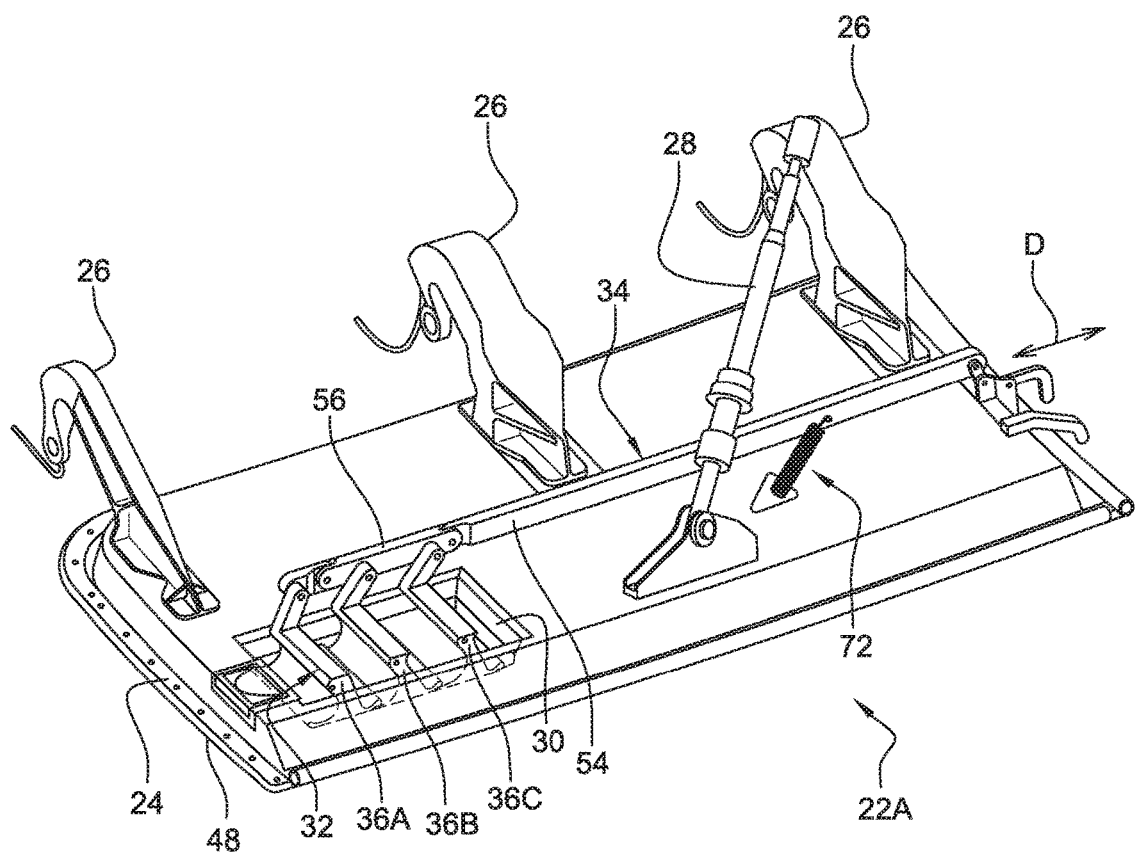
FIG. 2 is a perspective, diagrammatic view of a rear door of the landing gear box of FIG. 1, illustrating in particular an orifice of the door, a closure member mounted in the orifice, and means for driving the closure member.

FIG. 2 illustrates one of the rear doors 22A. As this figure shows, the rear door takes the form of a main panel 24 provided with articulation arms 26, for example of the "swan-neck" type, and numbering three. The main panel 24 is also connected to a drive rod 28 intended to be connected to the landing gear 12 so as to couple the movement of lowering/raising of the landing gear to the movement of opening/closing of the rear door. The main panel 24 also comprises an orifice 30 intended for the passage of air.

According to a feature of the invention, the rear door 22A also comprises a closure member 32 mounted in the orifice 30 and moveable between a closed configuration in which the closure member 32 seals the orifice 30, and an open configuration in which the closure member 32 allows a flow of air through the orifice 30. The rear door 22A finally comprises drive means 34 which comprise a mechanism allowing driving of the closure member 32 between the closed configuration (FIGS. 3 and 4) and the open configuration (FIGS. 5 and 6), as will appear more clearly from the description below.

Figure 3:
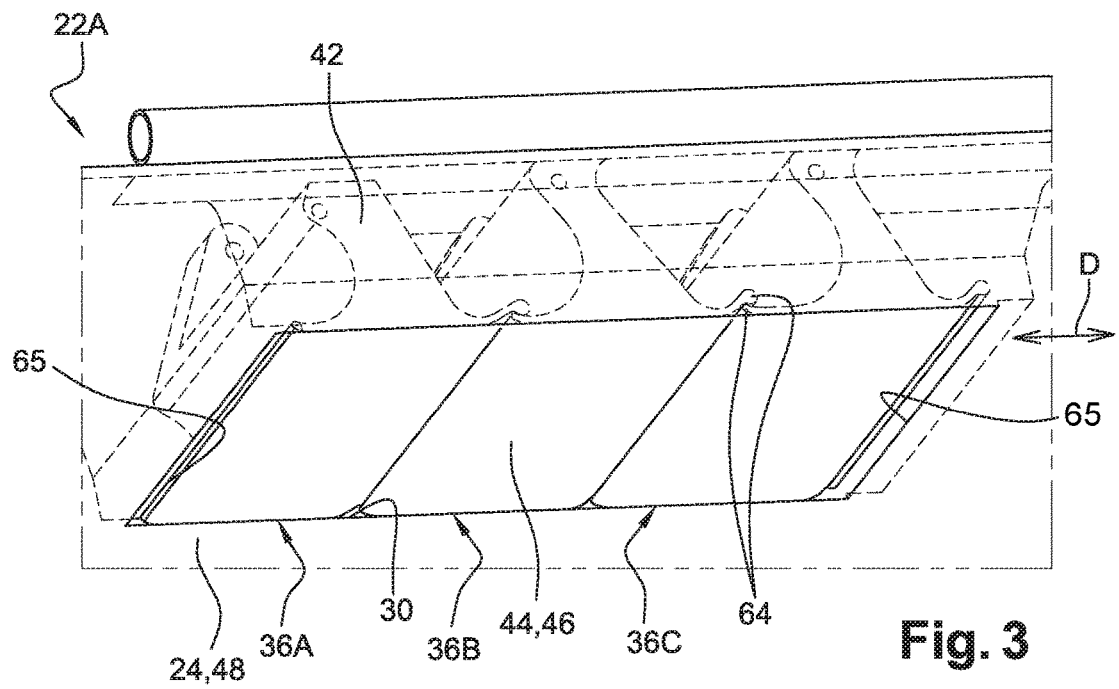
FIGS. 3 and 4 are partial, perspective, diagrammatic views of the rear door of FIG. 2, illustrating respectively an outside and an inside of the rear door, and showing more particularly the closure member in the closed configuration.
Figure 4:
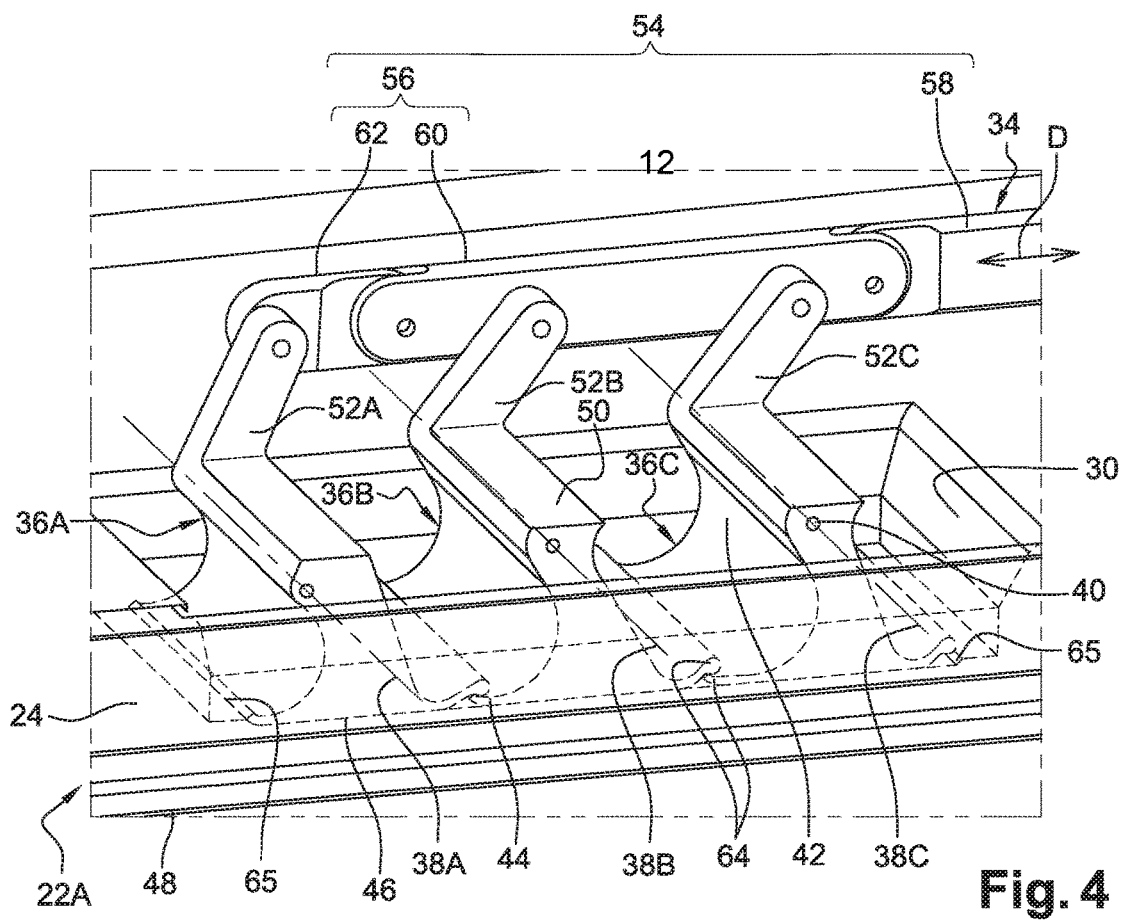
Figure 5:
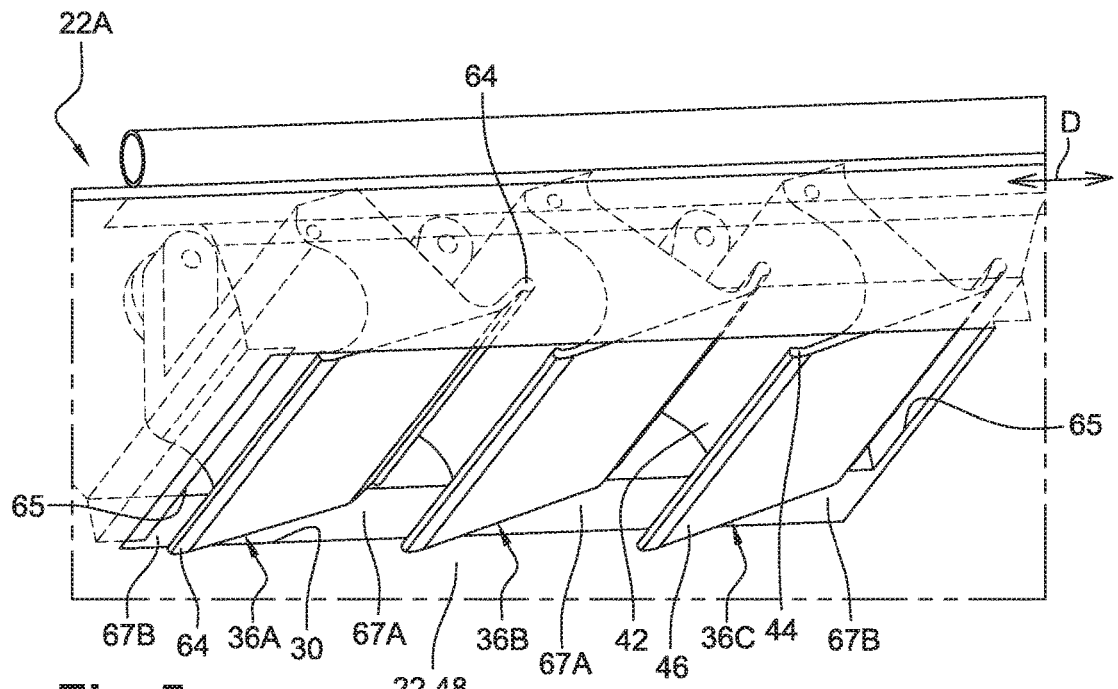
FIGS. 5 and 6 are partial, perspective, diagrammatic views of the rear door of FIG. 2, illustrating respectively an outside and an inside of the rear door, and showing more particularly the closure member in the open configuration.
Figure 6:
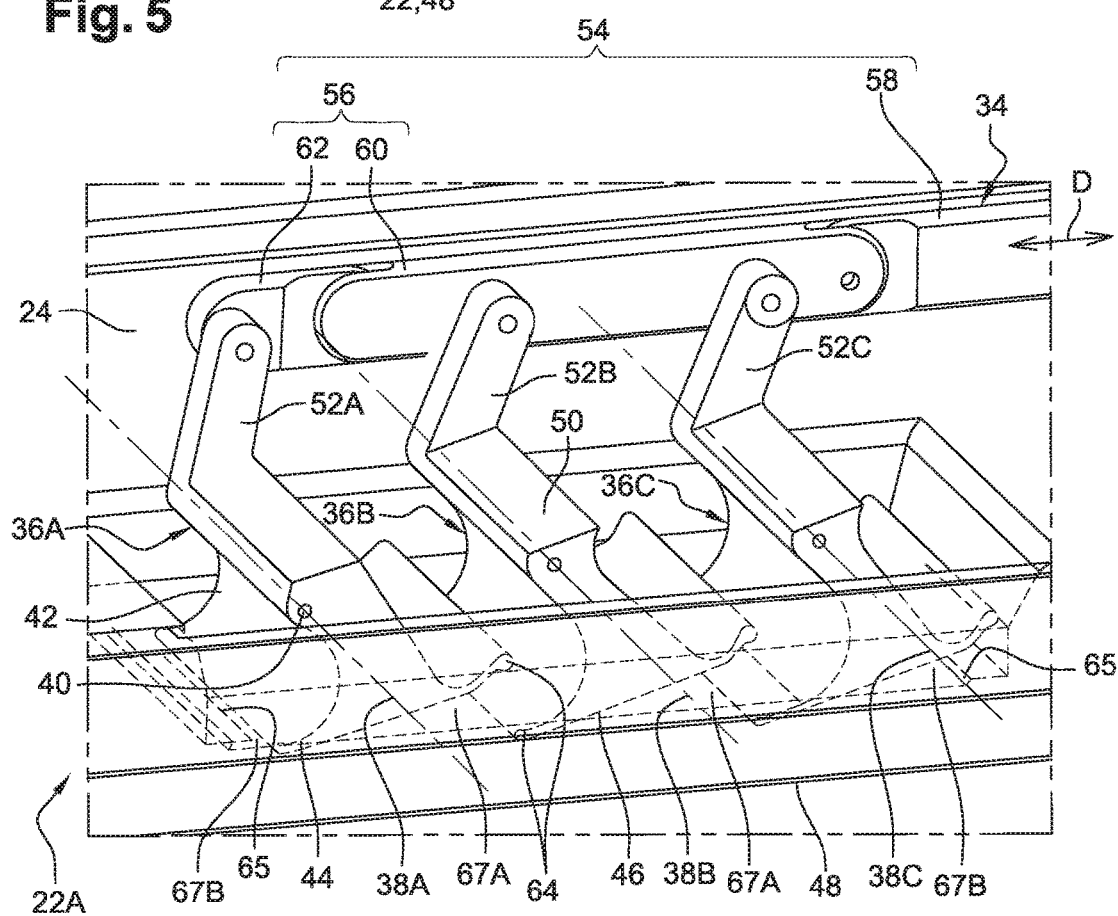

In the example illustrated, the closure member 32 is formed from several flaps 36A, 36B, 36C mounted pivoting around respective axes 38A, 38B, 38C (FIGS. 4 and 6) fixed relative to the door 22A, such that the flaps are contiguous in the closed configuration of the closure member 32 visible on FIGS. 3 and 4, and such that the flaps are spaced apart from each other in the open configuration of the closure member visible on FIGS. 5 and 6.

As a variant, the closure member 32 may comprise a single flap without leaving the scope of the invention.

For reasons of clarity, means allowing the mounting of the flaps 36A, 36B, 36C around the axes 38A, 38B, 38C are not shown on the figures. These mounting means may be of a conventional type, for example taking the form of caps formed on the main panel 24 on either side of each flap, and shafts mounted in the caps and inserted respectively in the respective mounting holes 40 of the flaps (FIGS. 4 and 6).

In the example illustrated, each of the flaps 36A, 36B, 36C is formed from a body 42 integrating the mounting opening 40 and terminating at a first end in a sealing plate 44 which has an aerodynamic outer surface 46 intended to form part of an aerodynamic outer surface 48 of the main panel 24. At a second end 50 situated on the opposite side to the sealing plate 44, each of the flaps 36A, 36B, 36C comprises, for example, a connecting arm 52A, 52B, 52C.

Still as an example, the drive means 34 comprise a connecting element 54 which is movable in translation and connects the flaps 36A, 36B, 36C together. The connecting element 54 has an elongated form and comprises a first end portion 56 on which the connecting arms 52A, 52B, 52C are hinged. In the example illustrated, the connecting element is formed from three segments mounted end to end, namely a main segment 58, an intermediate segment 60 and an end segment 62. One of the flaps 36A is connected to the end segment 62, while the other two flaps 36B and 36C are connected to the intermediate segment 60. In this example, the first end portion 56 thus comprises the intermediate segment 60 and the end segment 62. This particular configuration takes into account differences in shape and/or orientation of the flaps.

As illustrated by FIGS. 3 to 6, a movement of the connecting element 54 substantially in translation in a direction D parallel to the main panel 24, allows the flaps 36A, 36B, 36C to pivot about their respective axes 38A, 38B, 38C and thus cause the opening or closure of the orifice 30 depending on the direction of movement of the connecting element 54.

In fact, in the position of the flaps illustrated on FIGS. 3 and 4, the flaps 36A, 36B, 36C are oriented such that their respective sealing plates 44 form part of the aerodynamic outer surface 48 of the main panel 24 and are contiguous two by two, and such that the respective sealing plates 44 of the flaps 36A and 36C forming the ends of the closure member 32 are in contact with corresponding edges 65 of the orifice 30, so that the flaps then close the orifice 30. To this end, the sealing plates 44 preferably comprise end lips 64 which cooperate by overlapping and which are preferably provided with sealing gaskets (not shown on the figures). When the flaps 36A, 36B, 36C are in this position, the closure member 32 comprising the three flaps is therefore in its closed configuration.

However, in the position of the flaps illustrated on FIGS. 5 and 6, the flaps 36A, 36B, 36C are oriented such that their respective sealing plates 44 are angled relative to the aerodynamic outer surface 48 of the main panel 24, and thus leave spaces 67A between the flaps so as to allow the flow of air through the orifice 30. Incidentally, this configuration of the closure member 32 also presents spaces 67B between the edges 65 of the orifice 30 and the flaps 36A and 36C respectively.

Figure 7:
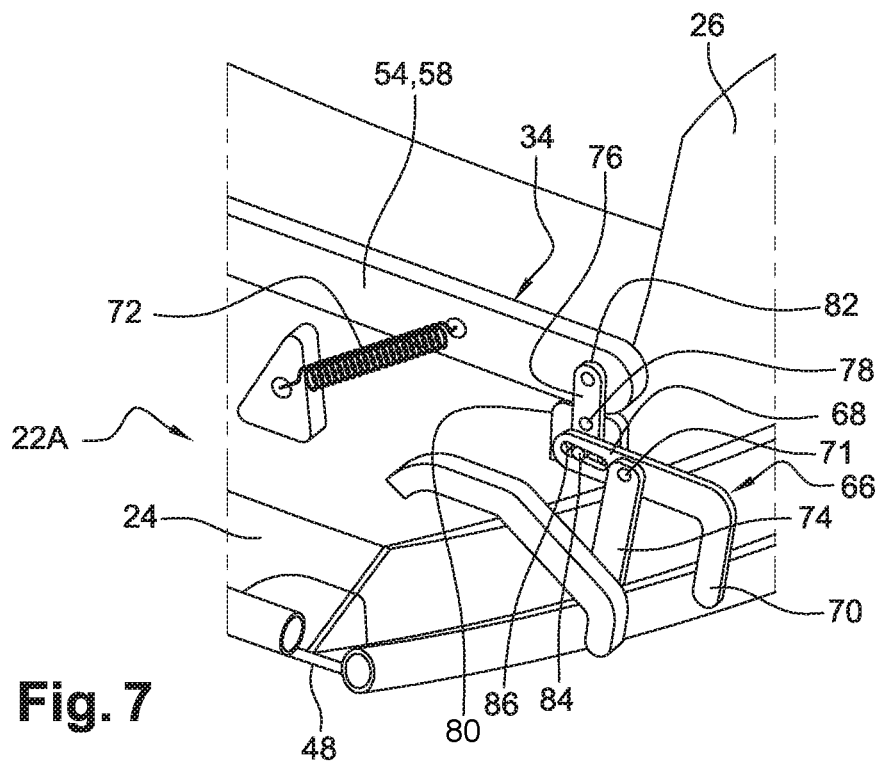
FIGS. 7 and 8 are partial, perspective, diagrammatic views of the rear door of FIG. 2, illustrating in particular part of the drive means of the closure member, respectively in a closed configuration and in an open configuration of the closure member.
Figure 8:
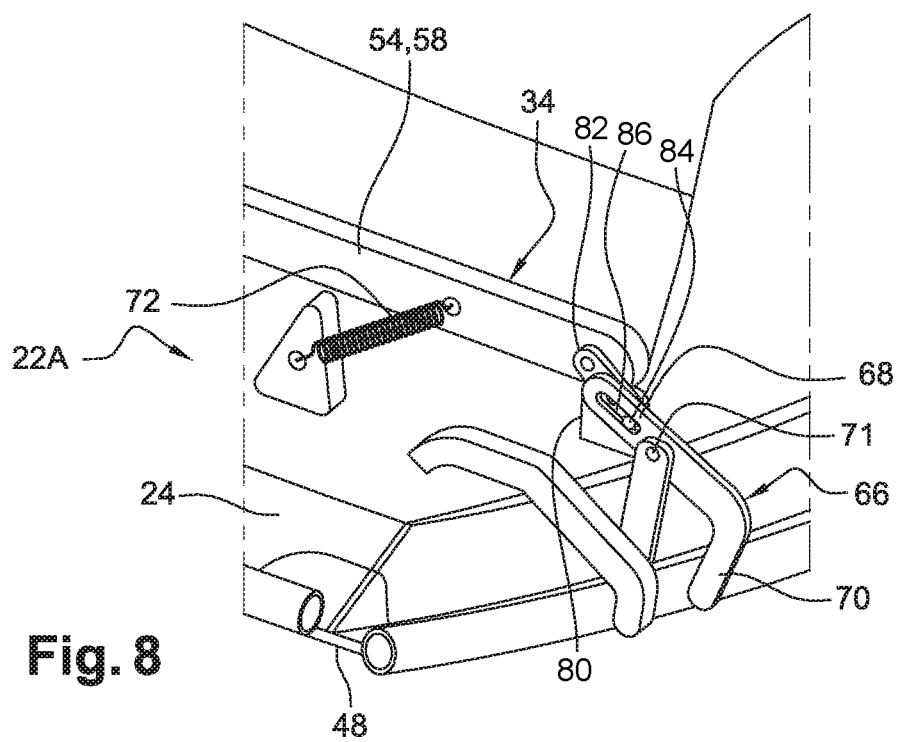

FIGS. 7 and 8, in particular, illustrate the drive means 34 belonging to the rear door 22A. These means take the form of a mechanism designed to cooperate with the corresponding front door 20A so as to drive a movement of the closure member 32 towards its open configuration when the front door 20A is moved from its closed position to its open position, and so as to drive a movement of the closure member 32 into its closed configuration when the front door 20A is moved from its open position to its closed position.

To this end, in the embodiment illustrated, the drive means 34 comprise a lever 66 mounted pivotingly on the rear door 22A such that the lever 66 can be moved between a first position illustrated on FIG. 7 and a second position illustrated on FIG. 8.

More precisely, the lever 66 comprises a first lever portion 68 connected to the closure member 32 via the connecting member 54, such that the lever 66 stresses the closure member 32 towards its closed configuration when the lever adopts its first position, and such that the lever 66 stresses the closure member 32 towards its open configuration when the lever adopts its second position.

Furthermore, the lever 66 comprises a second lever portion 70 which cooperates with the corresponding front door 20A such that a movement of the front door towards its open position causes a movement of the lever towards its second position, whereas a movement of the front door towards its closed position causes a movement of the lever towards its first position.

The first lever portion 68 and the second lever portion 70 are arranged on either side of a first pivot pin 71 carried by a first support 74 fixed to the main panel 24.

The drive means 34 preferably comprise a return device 72, for example formed as a spring, which stresses the lever 66 towards one of its first and second positions, while the corresponding front door 20A stresses the lever 66 towards the other of its first and second positions when the front door moves in a predefined direction.

In the example illustrated, the return device 72 exerts a traction on the connecting element 54 which in return exerts a thrust on the lever 66 towards the second position of the latter, corresponding to the open configuration of the closure member 32. As a variant, the return device 72 may exert a thrust directly on the lever 66.

In the example illustrated, the connection between the first lever portion 68 and the connecting element 54 is ensured by a rod 76 mounted in rotation around a second pivot pin 78 carried by a second support 80 fixed to the main panel 24. The rod 76 has a first end 82 connected in articulated fashion to the connecting element 54, and a second opposite end provided with a slider 84 engaged in a rail 86 formed in the first lever portion 68.

When the front door 20A is in the closed position, the second lever portion 70 rests on an edge of the front door which thus holds the lever 66 in its first position and therefore keeps the closure member 32 in its closed configuration.

When the front door 20A moves from its closed position to its open position, the lever 66 is free to move to its second position under the effect of the thrust applied by the return device 72. The closure member is thus driven towards its open configuration.

Conversely, when the front door 20A moves from its open position to its closed position, it pushes the second lever portion 70 against the thrust applied by the return device 72, so as to return the lever 66 into its first position corresponding to the closed configuration of the closure member 32.

Thus, as soon as the front doors 20A, 20B open at the beginning of a sequence of deployment of the landing gear 12, the respective closure members 32 of the rear doors 22A, 22B open to allow the air entering from the front of the landing gear box 14 to escape before the rear doors 22A, 22B open in turn.

Conversely, when the front doors close at the end of a sequence of retraction of the landing gear 12, the respective closure members 32 of the rear doors 22A, 22B close at the same time as the front doors 20A and 20B. In fact, air can no longer enter into the landing gear box 14 from the front, so that opening of the orifice 30 of each rear door is no longer beneficial.

In the preferred embodiment of the invention described above, the drive means 34 thus constitute, in the terminology of the invention, control means allowing triggering of a movement of the closure member 32 belonging to the rear door 22A, 22B from the closed configuration to the open configuration of the closure member as soon as the front door 20A, 20B moves from its closed position to its open position, and triggering of a movement of the closure member 32 belonging to the rear door 22A, 22B from the open configuration to the closed configuration of the closure member when the front door 20A, 20B moves from its open position to its closed position.

As a variant, the drive means may comprise an electric motor or an electric, hydraulic or pneumatic actuator controlled so as to bring the closure member into the open position when the front door opens, and so as to bring the closure member into the closed position when the front door closes. In this case, the aircraft may comprise control means separate from the drive means. This control means may in effect comprise an electric, hydraulic or pneumatic device allowing activation and deactivation of the drive means.

The landing gear box 14 described above may advantageously be used to implement a method of deployment of an aircraft landing gear and to implement a method of retraction of such a landing gear.

The method of deployment of an aircraft landing gear according to the invention comprises a first step comprising moving the or each front door 20A, 20B of the landing gear box 14 from its closed position to its open position, and moving the closure member 32 belonging to the or each rear door 22A, 22B from the closed configuration to the open configuration of the closure member. The method comprises a second subsequent step comprising deploying the landing gear 12 such that the landing gear drives the or each rear door 22A, 22B towards its open position.

The method of retracting an aircraft landing gear according to the invention comprises a first step comprising retracting the landing gear 12 such that the landing gear drives the or each rear door 22A, 22B towards its closed position. The method comprises a second subsequent step comprising moving the or each front door 20A, 20B of the landing gear box 14 from its open position to its closed position, and moving the closure member 32 belonging to the or each rear door 22A, 22B from the open configuration to the closed configuration of the closure member.

The invention has been described above as an example in an application to a front landing gear, but may be applied similarly to a rear landing gear of an aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing gear box for an aircraft, comprising:
   a frame provided with an opening for passage of a landing gear, and
   at least one front door and at least one rear door which are mounted movably relative to the frame between respective open positions in which the front door and the rear door allow extension of the landing gear through the opening of the frame, and respective closed positions in which the front door and rear door close the opening in the frame, wherein the front door is located on a front side of the landing gear box and the rear door is located on a rear side of the landing gear box,
   the rear door comprising at least one orifice formed in the rear door,
   a closure member mounted in the orifice and movable between a closed configuration in which the closure member seals the orifice, and an open configuration in which the closure member allows a flow of air through the orifice, and
   drive means for driving the closure member from the closed configuration to the open configuration and vice versa, independently of any movement of the rear door.

2. The landing gear box according to claim 1, wherein the drive means belonging to the rear door form a mechanism which cooperates with the front door so as to cause a movement of the closure member into the open configuration when the front door is moved from the closed position to the open position, and so as to cause a movement of the closure member into the closed configuration when the front door is moved from the open position to the closed position.

3. The landing gear box according to claim 2, wherein the drive means comprise a lever mounted pivotingly on the rear door such that the lever can be moved between a first position and a second position, the lever comprising a first lever portion connected to the closure member such that the lever stresses the closure member towards its closed configuration when the lever adopts its first position, and such that the lever stresses the closure member towards its open configuration when the lever adopts its second position, and the lever comprising a second lever portion which cooperates with the front door such that a movement of the front door towards its open position causes a movement of the lever towards its second position, whereas a movement of the front door into its closed position causes a movement of the lever towards its first position.

4. The landing gear box according to claim 3, wherein the drive means also comprise a return device which stresses the lever towards one of the first and second positions, and wherein the front door stresses the lever towards the other of the first and second positions when the front door moves in a predefined direction.

5. The landing gear box according to claim 3, wherein the drive means comprise a connecting member connecting the flaps together, and wherein the first lever portion is connected to the connecting member which connects the flaps together.

6. The landing gear box according to claim 1, wherein the closure member comprises several flaps mounted pivoting around respective axes fixed relative to the door such that the flaps are contiguous in the closed position of the closure member and such that the flaps are spaced apart in the open configuration of the closure member.

7. The landing gear box according to claim 6, wherein the drive means comprise a connecting member connecting the flaps together.

8. An aircraft comprising a landing gear and a landing gear box according to claim 1, in which said landing gear is housed in a manner allowing movement of the landing gear from a position in which the landing gear is retracted inside the landing gear box to a position in which the landing gear is deployed outside the landing gear box, and vice versa.

9. The aircraft according to claim 8, wherein the rear door comprises mechanical connecting means which connect the rear door to the landing gear such that the landing gear drives the rear door from the closed position to the open position during deployment of the landing gear, and such that the landing gear drives the rear door from the open position to the closed position during retraction of the landing gear.

10. The aircraft according to claim 8, comprising control means configured to cause a movement of the closure member belonging to the rear door from the closed configuration to the open configuration of the closure member as soon as the front door moves from the closed position to the open position, and to cause a movement of the closure member belonging to the rear door from the open configuration to the closed configuration of the closure member when the front door moves from the open position to the closed position.

11. A method for deploying a landing gear of an aircraft according to claim 8, comprising successive steps comprising:

moving the front door from the closed position to the open position of the front door, and moving the closure member belonging to the rear door from the closed configuration to the open configuration of the closure member, then deploying the landing gear such that the landing gear drives the rear door towards the open position.

12. The method for retracting a landing gear of an aircraft according to claim 8, comprising successive steps comprising:

retracting the landing gear such that the landing gear drives the rear door towards the closed position, then moving the front door from the open position to the closed position of the front door, and moving the closure member belonging to the rear door from the open configuration to the closed configuration of the closure member.

13. A landing gear box for an aircraft, comprising:

a frame provided with an opening for passage of a landing gear, and at least one front door and at least one rear door which are mounted movably relative to the frame between respective open positions in which the front door and the rear door allow extension of the landing gear through the opening of the frame, and respective closed positions in which the front door and rear door close the opening in the frame, the rear door comprising at least one orifice, a closure member mounted in the orifice and movable between a closed configuration in which the closure member seals the orifice, and an open configuration in which the closure member allows a flow of air through the orifice, and drive means for driving the closure member from the closed configuration to the open configuration and vice versa, independently of any movement of the rear door, wherein the closure member comprises several flaps mounted pivoting around respective axes fixed relative to the door such that the flaps are contiguous in the closed position of the closure member and such that the flaps are spaced apart in the open configuration of the closure member.

14. The landing gear box according to claim 13, wherein the drive means comprise a connecting member connecting the flaps together.

\* \* \* \* \*